Patented July 16, 1929.

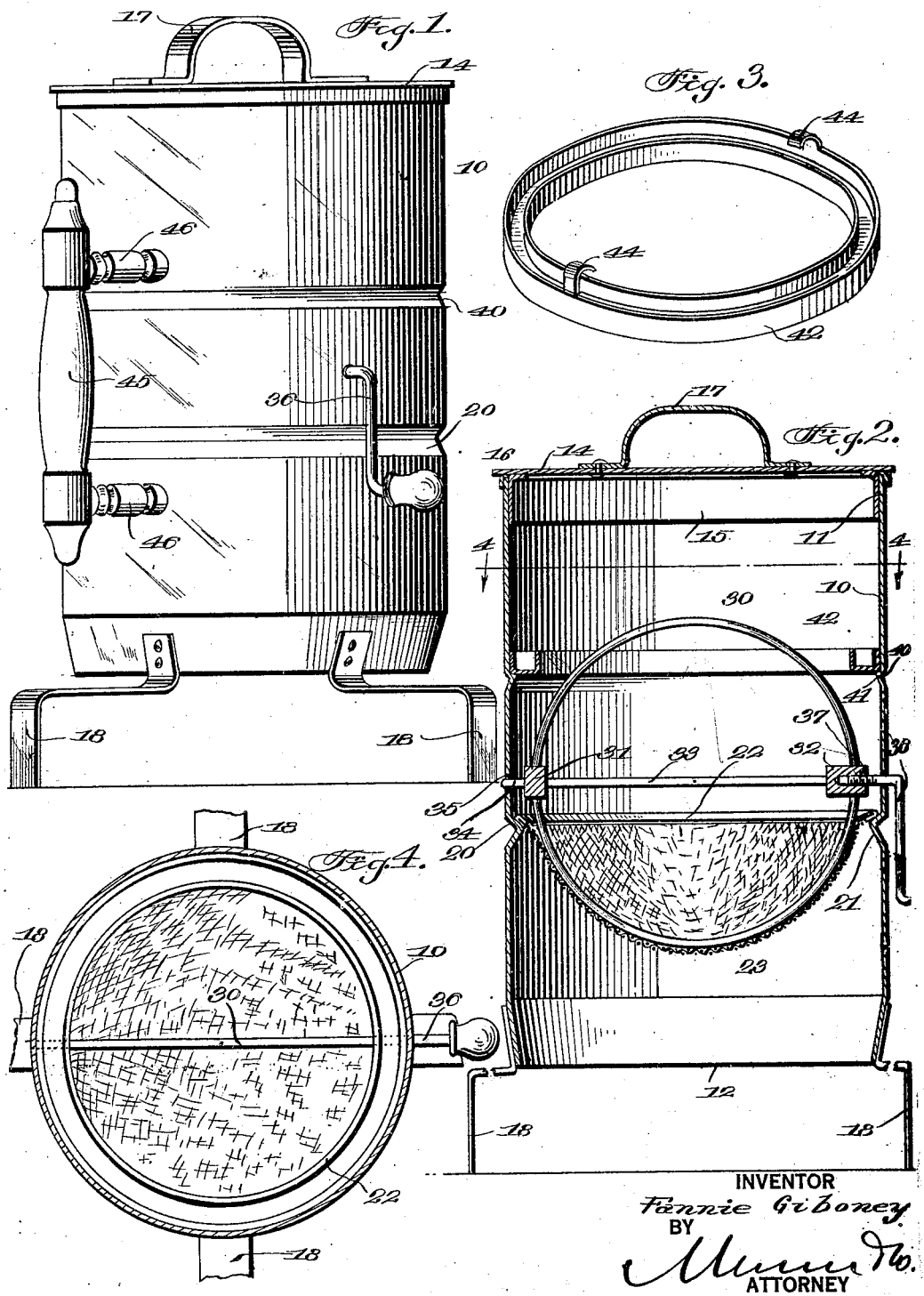

1,721,340

UNITED STATES PATENT OFFICE.

FANNIE GIBONEY, OF BAKERSFIELD, CALIFORNIA.

FRUIT MASHER AND STRAINER.

Application filed August 28, 1928. Serial No. 302,582.

This invention relates to a combined fruit masher and strainer.

An object of the invention is the provision of a device for crushing and straining fruit in which a revolving beater cooperates with a sieve for removing the juice while a ring, U-shaped in cross section, collects the juice extracted pulp and seeds thrown off by the beater.

A further object of the invention is the provision of the container equipped with a removable beater operating in conjunction with a removable strainer, the container above the strainer having a removable compartment for collecting pulp and seeds thrown off from the strainer by the beater.

This invention will be best understood from a consideration of the following detailed description, in view of the accompanying drawings forming a part of the specification; nevertheless it is to be understood that the invention is not confined to the disclosure, being susceptible of such changes and modifications which shall define no material departure from the salient features of the invention as expressed in the appended claims.

Figure 1 is a view in elevation of a combined masher and strainer for fruits.

Figure 2 is a vertical section of the same.

Figure 3 is a view in perspective of an annular collector for seeds and pulp.

Figure 4 is a horizontal section taken along the line 4—4 of Figure 2.

Referring more particularly to the drawings, 10 designates a container having the upper and lower ends open as shown at 11 and 12. The upper end has a removable closure 14 in which an annular flange 15 is received by the open end and an extension 16 supports the closure on the top of the vessel or container. A handle 17 is provided for facilitating the ready removal of closure.

The container is supported by legs 18 secured in any approved manner as by means of rivets to the outer inclined face of the lower end of the container. The lower ends or feet of the legs are adapted to be placed in a pan which collects the fruit juice from the container.

The vessel intermediate the opposite ends thereof has depressed therein an annular groove 20 to provide an internal rib 21 upon which is removably supported a ring 22 which is secured to the upper free end of a semi-spherical screen or strainer 23. The mesh of the screen is of such a character that the fruit juices will pass through the same while retaining the pulp, skin and seeds.

A beater or masher in the form of a circular piece of wire 30 is provided with hubs 31 and 32 at diametrically opposite points. An axle 33 is secured to the hubs and has an end 34 mounted in a bearing 35 formed in the wall of the container. A crank 36 has a threaded portion 37 screwed into the hub 32.

The container above the rib 21 has an external annular groove 40 forming an internal annular rib 41 for supporting a ring or compartment 42 which is U-shaped in cross section and is adapted to catch the seeds, pulp, and skins thrown off by the masher 30 which moves through a horizontal plane passing through the compartment 42. The upper portion of the path of movement of the masher 30 projects above the plane of the compartment so that said beater will be in a position when operating in the upper portion of the path to throw off matter towards the compartment.

Handles 42 are provided at diametrically opposite points on the compartment and extend sufficiently inwardly whereby they may be grasped conveniently by the fingers of the operator for the purposes of removing the compartment when filled.

A handle 45 is connected in spaced relation with the outer wall of the container 10 by means of horizontal bars 46. The handle provides a ready means of conveying the container when desired.

The operation of my device is as follows:

The boiled or fresh fruits are placed in the strainer 23 and the top 14 is placed in position. The crank is operated causing the masher to be revolved through the fruit and in close association with the wire netting. The fruit is thus impressed against the strainer forcing the skins and seeds away from the side walls and upwardly towards the upper wall of the container. The discarded portion of the fruits collected in the compartment 42 which is emptied when necessary.

The revolving member 30 not only crushes the fruit, but maintains it in a state of agitation to permit the juice to flow through the strainer while preventing clogging of the wire mesh screen.

The device is particularly useful as a household article in that it eliminates the usual straining of fruit juice over night in a sack or cloth. In such a case the cooked fruit or berries to be converted into jelley is poured into the open upper end of the container after the legs 18 have been placed in a suitable bowl for collecting the juice. The masher is revolved to impress the juice from the pulp and skins while discarding skins and seeds which are collected in the compartment 42.

I claim:

1. A combined masher and strainer for fruit comprising a container open at the opposite ends thereof, a closure for the upper open end, a strainer mounted within and intermediate the open ends of the container, a beater rotatably mounted in the strainer, a ring U-shaped in cross section removably supported within the container and embracing the path of movement of the beater, said ring forming an annular compartment being adapted to collect pulp and other matter thrown off by the beater.

2. A combined masher and strainer for fruit comprising a container open at the opposite ends thereof, a closure for the upper open end, a strainer mounted within and intermediate the open ends of the container, a beater rotatably mounted in the strainer, a ring U-shaped in cross section removably supported within the container, said ring forming an annular compartment and being adapted to collect pulp and other matter thrown off by the beater.

FANNIE GIBONEY.